United States Patent
Verhelst et al.

(10) Patent No.: US 8,804,856 B2
(45) Date of Patent: Aug. 12, 2014

(54) PROGRAMMABLE ENGINE HAVING A RECONFIGURABLE ACCELERATOR DATA PATH FOR TESTING AND CALIBRATION OF ANALOG FRONT ENDS IN RADIO DEVICES

(75) Inventors: Marian K. Verhelst, Beaverton, OR (US); Hasnain Lakdawala, Beaverton, OR (US); Krishnamurthy Soumyanath, Portland, OR (US); Masoud Sajadieh, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 957 days.

(21) Appl. No.: 12/910,129

(22) Filed: Oct. 22, 2010

(65) Prior Publication Data
US 2012/0099630 A1    Apr. 26, 2012

(51) Int. Cl.
*H04L 27/00* (2006.01)
(52) U.S. Cl.
USPC ........................................... 375/259
(58) Field of Classification Search
USPC ......... 375/130, 222, 224, 225, 231, 259, 267; 455/77, 67.11, 84
See application file for complete search history.

(56) References Cited

U.S. PATENT DOCUMENTS

| | | | |
|---|---|---|---|
| 7,460,840 B2 * | 12/2008 | Creigh | 455/115.1 |
| 7,587,222 B2 | 9/2009 | Trachewsky et al. | |
| 2006/0030277 A1 * | 2/2006 | Cyr et al. | 455/77 |
| 2006/0035601 A1 * | 2/2006 | Seo | 455/78 |
| 2007/0096759 A1 * | 5/2007 | Weinraub | 324/763 |

OTHER PUBLICATIONS

Staszewski, et al. "Software Assisted Digital RF Processor (DRP™) for Single-Chip GSM Radio in 90 nm CMOS", IEEE Journal of solid-state circuits, vol. 45, No. 2, Feb. 5, 2010, pp. 276-288.

* cited by examiner

*Primary Examiner* — Sam K Ahn
*Assistant Examiner* — Syed Haider
(74) *Attorney, Agent, or Firm* — Cool Patent, P.C.

(57) ABSTRACT

Briefly, in accordance with one or more embodiments, a radio device comprises an analog front end comprising a radio to transmit and/or receive radio-frequency signals, and a programmable engine coupled to the analog front end. The programmable engine is capable of being programmed to perform one or more tests on the analog front end and includes a reconfigurable data path reconfigurable by the programmable engine to perform one or more tests on the analog front end.

10 Claims, 7 Drawing Sheets

PROGRAMMABLE ENGINE HAVING A RECONFIGURABLE ACCELERATOR DATA PATH FOR TESTING AND CALIBRATION OF ANALOG FRONT ENDS IN RADIO DEVICES

BACKGROUND

Radio devices having an analog front-end (AFE) undergo extensive calibrations and tests in the manufacturing environment after production by utilizing a radio-frequency (RF) tester to check whether performance the device is within specification and/or to retune certain components. However, since most calibration algorithms heavily rely on off-chip RF equipment or number crunchers, in-the-field monitoring, calibration, reconfiguration, device optimization and/or re-tuning of the analog front-end is difficult or not able to be performed. Furthermore, post-manufacturing test times become longer, for example greater than one minute, and the testing cost per unit may become a significant portion of the total manufacturing cost of the radio analog front end. Testing time inevitably will increase in the future as radio devices evolve towards smaller technologies having more variations and/or more complex radios, for example radio devices implementing multiple-input, multiple-output (MIMO), multiband radios, and so on. A few calibrations and/or tests are currently executed on the chip to save cost, however current implementations are done only for individuals tests and in an ad-hoc manner. Such an approach not only represents a huge waste of chip area via circuit duplication, but also complicates the manageability and development time, thereby increasing time to market (TTM). Post tape out bug fixing also becomes difficult if not nearly impossible. Furthermore, computationally complex calibration strategies currently cannot be executed on chip because current chips lack the flexibility, speed and/or computational resources to accomplish this. For example, a spectrum (blocker) sensing algorithm may involve one billion Fast Fourier Transform (FFT) butterfly operations per sec, which is impossible to realize with current multiply and accumulate (MAC) processors unless a huge amount of memory and/or dedicated digital signal processing logic is added requiring increased area, cost, and/or manageability.

After some time, a fraction of deployed chips may fail or start to fail. Since self-testing is almost inexistent for radios, the chip cannot be diagnosed remotely, and the device has to be shipped back to the original equipment manufacturer (OEM). Since the OEM typically may not have the expensive test equipment and expertise to do analog and radio-frequency (RF) tests, the only available option for the OEM is to replace the chip. However, replacement results in an unnecessarily large cost for the OEM due to shipping the device or replacing chips that might not be broken. Additionally, when a chip is untested and merely replaced, the chip manufacturer does not get any diagnosis of exactly what part of the chip caused the failure and whether the problem could have been solved by recalibration and/or retuning.

Currently every commercial radio platform which will be sold has to be certified by regulatory agency such as the Federal Communications Commission (FCC), industry interoperability groups, standards groups, and so on. The different organizations check whether the radio performs conformance to their specifications, for example spectrum mask compliance, sensitivity, transmit power, and so on. This is accomplished by performing extensive external measurements on a few samples of the new platform carrying the radio chips. Every time something is changed to the design or firmware of the radio chip or platform, the device has to be recertified. The certification and recertification process takes up to six months or so, thereby significantly delaying the time to market (TTM). Since there is an emerging trend to integrate the analog radio and the digital baseband processor on the same chip, and further to integrate the radio on the main processor die, there are potentially severe implications for the certification of the radios because recertification will be required every time something is altered in the overall chip design even when the change has little to do with the radio itself. Thus, the certification process may present a significant delay in designing a processor chip that incorporates a radio on the chip. Another trend is the shift towards smaller and smaller silicon technologies for implementing the radio chips which may result in more on-die variations from chip to chip. Testing and certifying only a limited number of chip samples during the certification phase ultimately may become insufficient to statistically account for the chip to chip variation.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
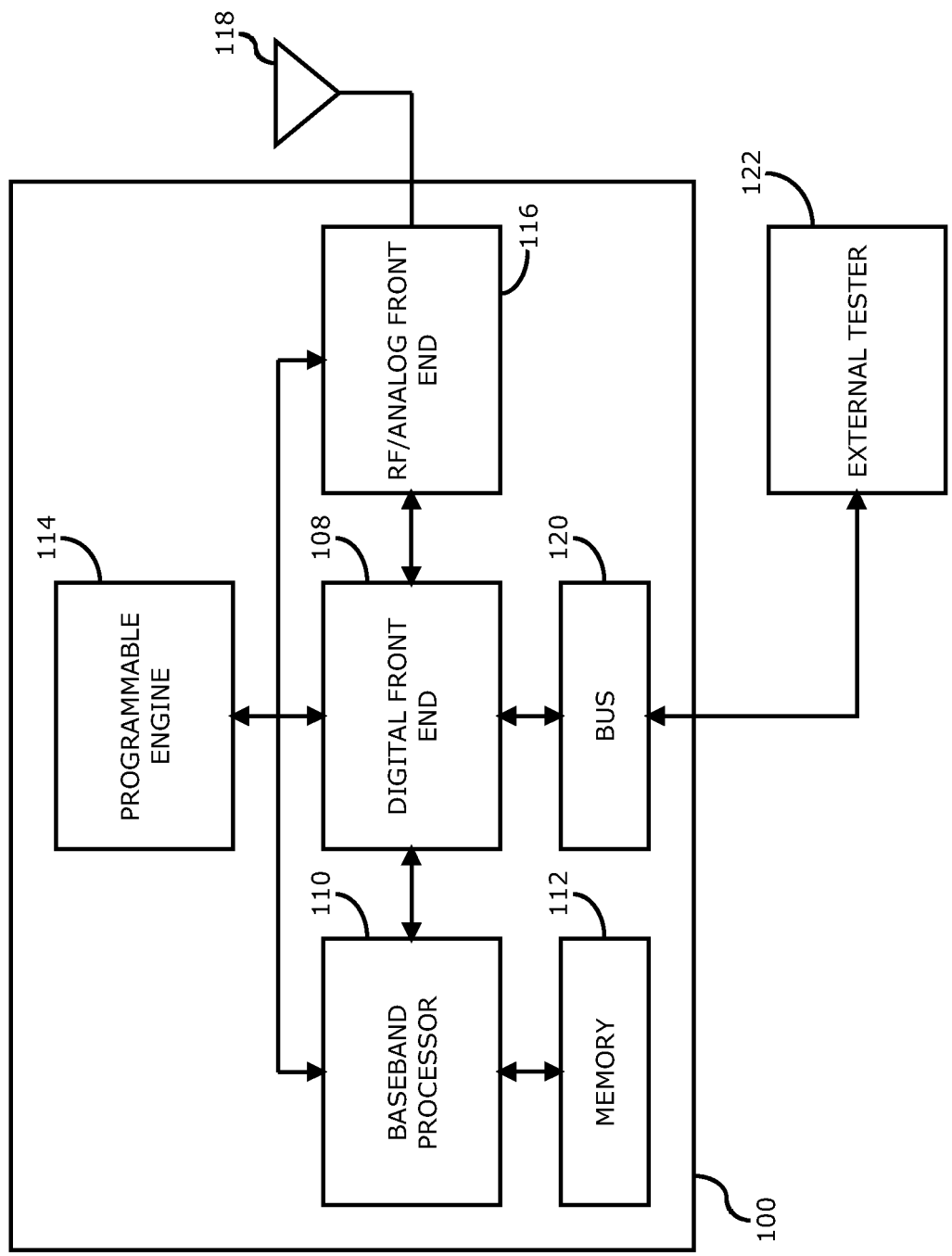
FIG. 1 is a block diagram of a radio device having a programmable engine having a reconfigurable data path in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a radio device having a programmable engine having a reconfigurable data path in accordance with one or more embodiments will be discussed. As shown in FIG. 1, an example radio device 100 may comprise, among other things, a baseband processor 110 and a memory 112 coupled to the baseband processor 110. Memory 112 may store data and/or programs for baseband processor 110 which may include volatile memory such as dynamic random-access memory (DRAM), non-volatile memory such as flash memory, or alternatively may include other types of storage such as a hard disk drive, although the scope of the claimed subject matter is not limited in this respect. It should be noted that some portion or all of memory 112 may be included on the same integrated circuit as baseband processor 110, or alternatively some portion or all of memory 112 may be disposed on an integrated circuit or other medium, for example a hard disk drive, that is external to the integrated circuit of baseband processor 110, although the scope of the claimed subject matter is not limited in this respect. The baseband processor 110 couples to a digital front end 108 which in turn couples to a radio-frequency (RF) analog front end (AFE) 116. A programmable engine 114 is coupled to digital baseband processor 110, digital front end 108, and analog front end 116 as will be discussed further herein. The programmable engine 114 provides programmable functionality including but not limited to testing and/or calibration. The digital front end 108 includes functional blocks such as various digital filters and/or impairment compensator blocks. The analog front end 116 provides radio communication via one or more antennas 118 according to the particular radio design, for example to achieve antenna diversity, to implement multiple-input, multiple-output (MIMO) functions, and so on, although the scope of the claimed subject matter is not limited in this respect.

In one or more embodiments, programmable engine 114 comprises a flexible engine dedicated to and/or closely tied with analog front end 116 and may be sufficiently computationally powerful to enable on-chip radio testing, in-the-field front eng and device monitoring, calibration, retuning, and/or optimization of analog front end 116, among other functions. In such arrangements, programmable engine 114 may be programmed to be a calibration and test engine for analog front end 116, although the scope of the claimed subject matter is not limited in this respect. As will be discussed in further detail with respect to FIG. 2, below, programmable engine 114 provides a flexible, manageable, and cost effective approach to implement processing power dedicated to front-end calibration and test on radio device 100 that is firmware programmable, a reconfigurable and computationally powerful shared data path, and provides centralized management and interfacing to test and/or calibrate analog front end 116. As a result, programmable engine 114 provides the ability of on-chip test stimuli generation, complex and fast on-chip post-processing of the results, a centralized management of all front-end calibration and test procedures, a standardized communication path via bus 120 to an external tester 122, and/or the flexibility to program a variety of current and future calibration or test algorithms. An example architecture for programmable engine 114 is shown in and described with respect to FIG. 2, below.

Figure 2:
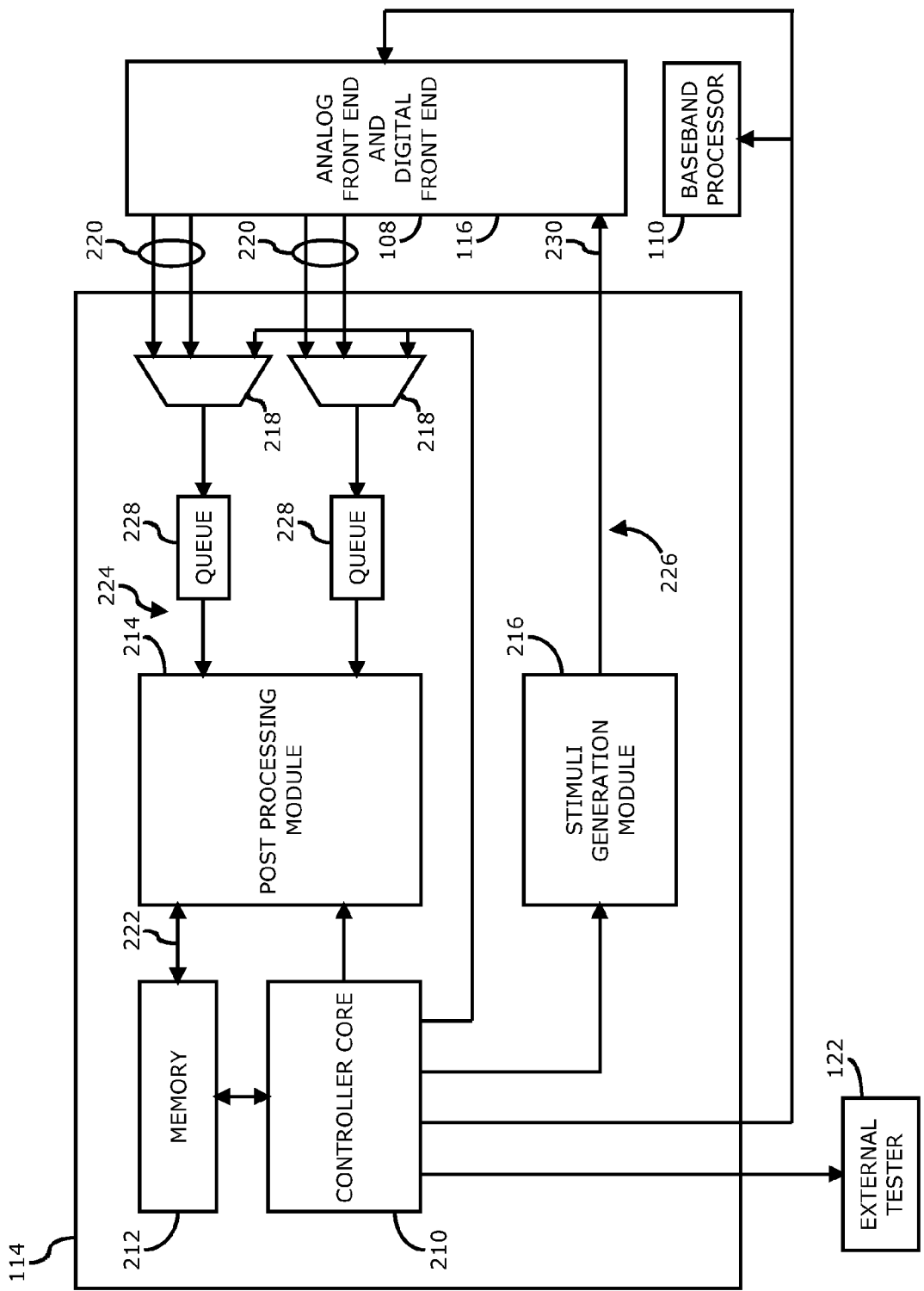
FIG. 2 is a block diagram of an example architecture of a programmable engine having a reconfigurable data path in accordance with one or more embodiments.

Referring now to FIG. 2, a block diagram of an example architecture of a programmable engine having a reconfigurable data path in accordance with one or more embodiments will be discussed. As shown in FIG. 2, programmable engine 114 may comprise a controller core 210 having a memory 212, a post processing module 214, and a stimuli generation module 216. Memory 212 is coupled to post processing module 214 via connection path 222, and post processing module 214 couples to analog front end 116 and/or digital front end 108 via connection path 224. Likewise, stimuli generation module 216 may couple to analog front end 116 and/or digital front end 108 via connections 220 and multiplexers 218. In some embodiments, first in, first out (FIFO) queues 228 may be disposed in connection path 224. In one or more embodiments, programmable engine 114 may be built around a programmable controller core 210 that may comprise an Intel Architecture (IA) nanocore implementing an x86 (IA-32 or IA-64) instruction set or the like, or an Intel ATOM processor or the like, as some examples, although the scope of the claimed subject matter is not limited in this respect. Instructions for controller core 210 may be stored in memory 212. Various sequences of tests to be executed by programmable engine 114 may be stored as firmware instructions in memory 212. Controller core 210 handles all control tasks such as configuration of programmable engine 114, analog front end 116 and/or digital front end 108, and also communication with an optional off-chip external tester 122 and/or the baseband processor 110. In the arrangement of programmable engine 114 shown, controller core 210 does not need to process data, except optionally very simple, low-rate, non-stream based, infrequent operations. The programmability of controller core 210 allows the capability of post-tape out updates towards future tests and/or post-fabrication bugs, thereby reducing time to manufacture (TTM.) The programmability of controller core 210 also provides reusability over different subsequent chip generations of radio device 100. Since controller core 210 is in control of the tests implemented by programmable engine 114, controller core 210 may provide centralized management of all or nearly all test operations in their entirety, although the scope of the claimed subject matter is not limited in this respect.

In one or more embodiments, programmable engine 114 provides a reconfigurable stream data path 226 tuned to calibration and/or testing. Unlike any other on-chip radio test or calibration framework proposed before, programmable engine 114 comprises a reconfigurable data path 226 shared by the different calibration and/or test algorithms. By allowing the test and calibration algorithms to share a reconfigurable data path 226, larger compute power may be obtained with acceptable area usage. The reconfigurable data path 226 implemented by programmable engine 114 therefore may be application specific and may provide several powerful accelerator kernels typical and common for the target calibration and test algorithms. Reconfigurable data path 226 allows mapping various analog front-end (AFE) 116 test, calibration, in-the-field recalibration and performance, and/or environment monitoring algorithms. Depending on the algorithm to be executed, accelerator satellites may be configured and sequenced by configuring reconfigurable data path 226 differently for the different algorithms. Controller core 210 handles the configuration of reconfigurable data path 226. This stream based reconfigurable data path 226 comprises two data path sections. The first data path selection is provided by stimuli generation module 216 via connection 230, and the second data path selection is provided by connection 224 to post processing module 214. Stimuli generation module 216 provides the flexibility to generate baseband sinewaves optionally with a possible offset, DC values, orthogonal frequency division multiplexing (OFDM) packets and/or Gaussian noise, among other example test signals, via direct digital synthesis of sine waves and noise signals, or alternatively by loading the test signals from memory 212. Front-end output data from analog front end 116, that is the stimuli results, may then be processed in the post processing stream data path by post processing module 214. By reconfiguration, the reconfigurable data path 226 is able to map a variety of calibration and test algorithms and post-processing the response of the analog front end 116 in response to injected stimuli signals provided by stimuli generation module 216 to derive meaningful performance metrics for analog front end 116. In one or more embodiments, the reconfigurable data path 226 may run at a variable clock speed for example depending on the sampling rate of the analog-to-digital converter of the analog front end 116 and/or the executed algorithm. An example architecture of post processing module 214 of reconfigurable data path 226 is shown in and described with respect to FIG. 3, below.

Figure 3:
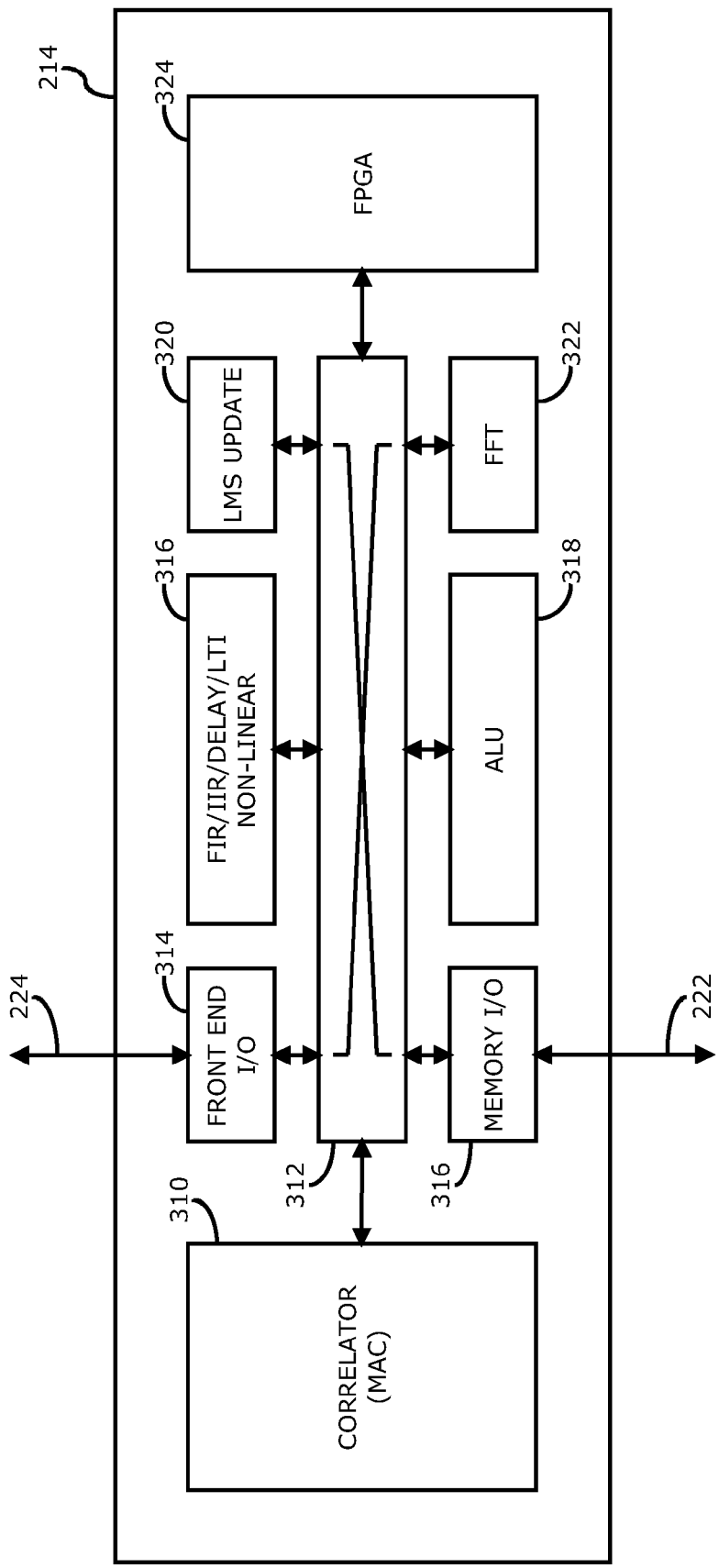
FIG. 3 is a block diagram of an example post processing module of a reconfigurable data path in accordance with one or more embodiments.

Referring now to FIG. 3, a block diagram of an example post processing module of a reconfigurable data path in accordance with one or more embodiments will be discussed. As shown in FIG. 3, post processing module 214 may comprise various internal operators and architecture determined by the targeted test algorithms and by the observation that many test and calibration algorithms are based on only a few basic operations such as adaptive filters via least mean square (LMS) filters, correlations, cross-correlations and auto-correlations via multiple and accumulate (MAC) operations, and/or spectrum sensing via fast Fourier transform (FFT) operations. These operations may be implemented in satellite accelerators in the stream data path of post processing module 214. For example, post processing module 214 may comprise a correlator module 310 to implement multiply and accumulate (MAC) operations, a reconfigurable impulse response module 316 to implement finite impulse response (FIR), infinite impulse response (IIR), delay, and/or linear time-invariant (LTI), and/or non-linear operations. Arithmetic logic unit (ALU) module 318 may be utilized to implement logic operations. LMS update module 320 may be utilized to implement adaptive filter operations. FFT module 322 may be utilized to implement Fourier transform operations. In one or more embodiments, the various satellite modules of post processing module 214 may be reconfigured internally, for example the filter order and filter coefficients, and so on, by controller core 210 of programmable engine 114. The satellites modules may be interconnected by a flexible crossbar interconnect network 312. The configuration of crossbar interconnect network 312 allows controller core 210 to sequence the satellite modules differently depending on the algorithm to be performed. Data may be directly fed from one satellite module into the next one without involving controller core 210 to perform data handling in order to save power and achieve higher performance. The data path in post processing module 214 may be extended with a field-programmable gate array (FPGA) 324 to offer even more flexibility towards mapping of future algorithms. It should be noted that there is no performance penalty in sharing the data path between different algorithms implemented by the satellite modules since the calibration and test algorithms may be run relatively infrequently. Post processing module 214 may further comprise a front end input/output (I/O) block 314 to couple to analog front end 116 via connection path 224, and a memory input/output (I/O) block 316 to couple to memory 212 and/or to controller core 210 via connection path 222, although the scope of the claimed subject matter is not limited in these respects. An example analog front end 116 is shown in and described with respect to FIG. 4, below.

Figure 4:
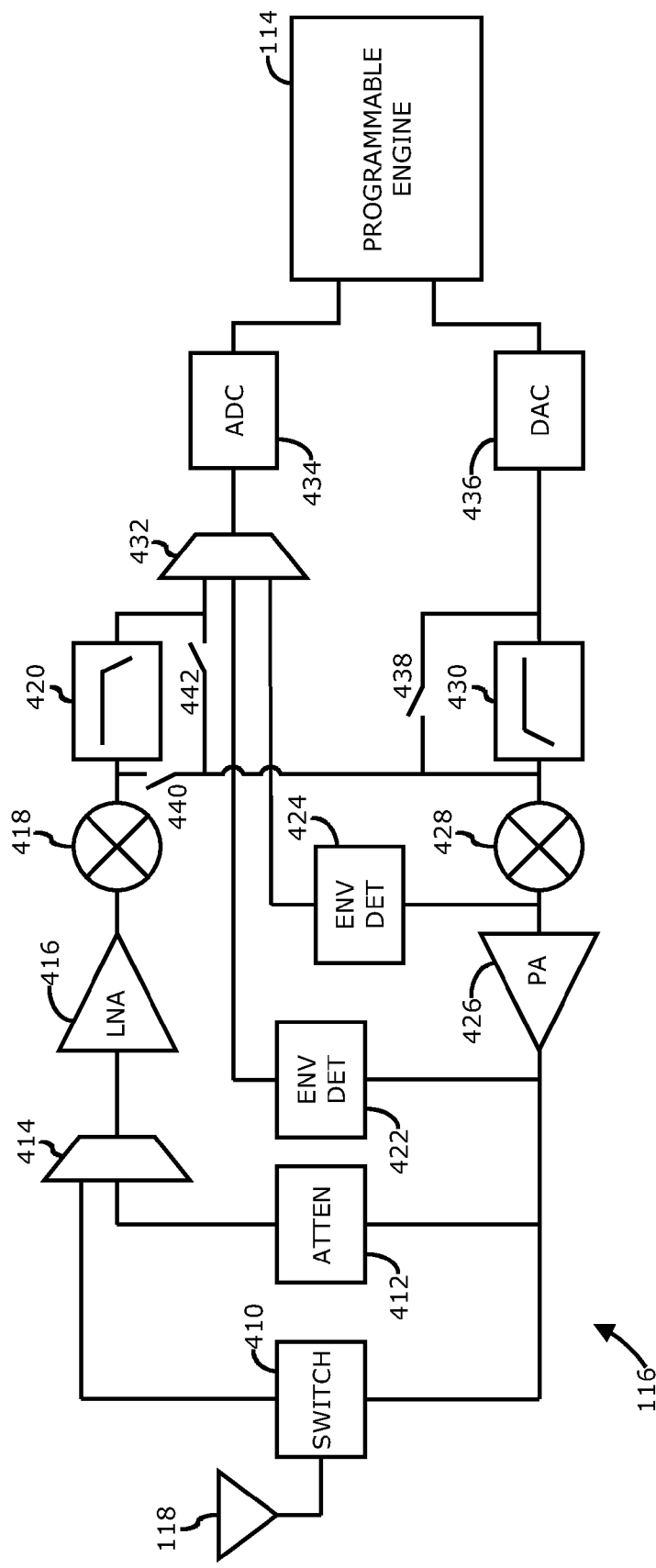
FIG. 4 is a block diagram of a radio-frequency analog front end capable of being controlled by a programmable engine in accordance with one or more embodiments.

Referring now to FIG. 4, a block diagram of a radio-frequency analog front end capable of being tested, calibrated and/or controlled by a programmable engine in accordance with one or more embodiments will be discussed. As shown in FIG. 4 and in conjunction with FIG. 1, analog front end 116 couples to programmable engine 114. Analog front end 116 may include a switch 410 to select between one or more antennas 118 and/or between the transmit and receive paths of analog front end 116. A receive path of analog front end 116 may include a low noise amplifier 416, mixer 418, and filter 420. An analog-to-digital converter (ADC) 434 converts a received signal into a digital format for processing by digital front-end 108 and programmable engine 114. Similarly, the transmit path of analog front end 116 may include a digital-to-analog converter (DAC) 436 to receive a digital baseband signal to be transmitted from digital front-end 108 or programmable engine 114 and convert the signal to an analog signal to be transmitted. The transmit path may further comprise a filter 430, mixer 428, and power amplifier (PA) 426. In one or more embodiments, analog front end 116 may include an attenuator 412 coupled to the transmit path and further to the receive path via multiplexer 414. A first envelope detector may be coupled to transmit path at the output of PA 426 and further to ADC via multiplexer 432. Optionally, a second envelope detector 424 may be coupled to an input of PA 426 and further coupled to ADC via multiplexer 432. In some embodiments, additional loopbacks may be utilized, such as between transmission (Tx) filter 430 output and the receive (Rx) filter 420 input, between the transmission filter 430 input and the receive filter 420 output, between the transmission filter 430 input and output, and/or between the receiver filter 420 input to output, controlled via switches 438, 440, and 442, among several examples. Such an arrangement of analog front end 116 may provide bypasses and/or loopback paths to increase the observability of internal nodes of analog front end 116 by programmable engine 114 by selecting desired nodes and/or a desired signal level via multiplexer 414 and/or multiplexer 432. Envelope detector 422 and envelope detector 424 allow monitoring the signal at the PA 426 at both its input and its output. Programmable engine 114 may also be capable of selecting operational settings of analog front end 116, for example bias currents, filter bandwidths, and so on, for testing and calibration. Adding extra observability circuitry to analog front end 116 to calibrate and/or test this front-end may further involve calibration and tests for these circuits, for example envelope detector 422 and/or envelope detector 424 may be calibrated with a reference voltage from a packaged precision resistor, although the scope of the claimed subject matter is not limited in these respects.

Figure 5:
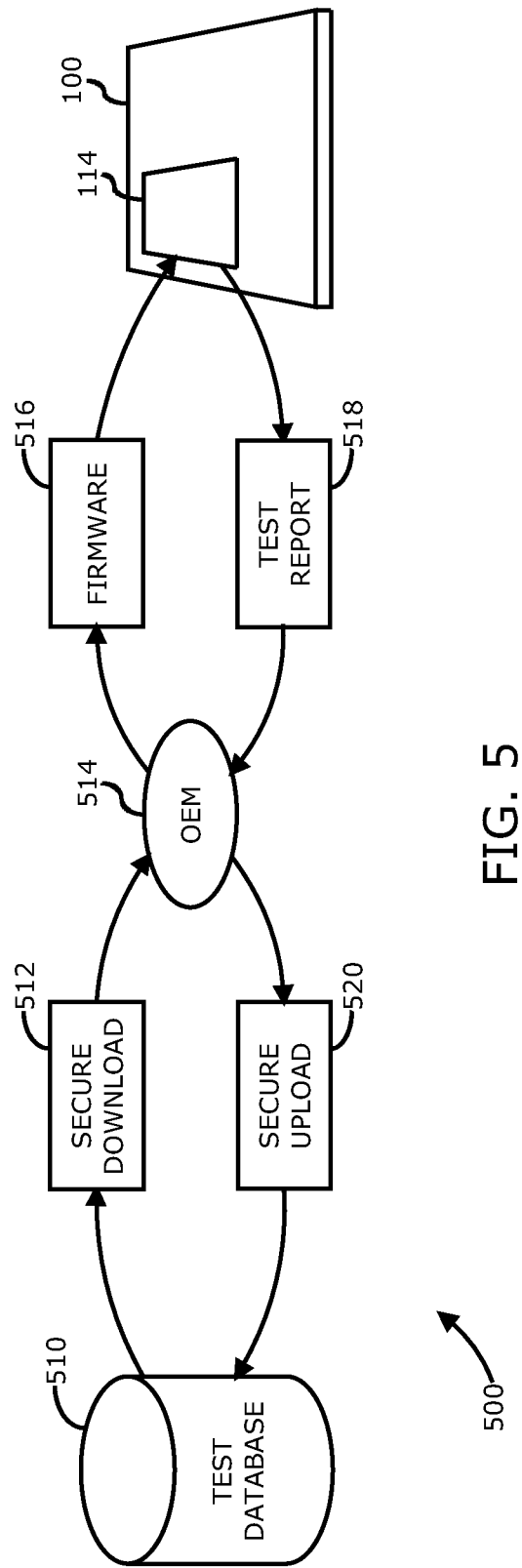
FIG. 5 is a block diagram of trusted data flow of diagnostic firmware and reports in accordance with one or more embodiments.

Referring now to FIG. 5, a block diagram of trusted data flow of diagnostic firmware and reports in accordance with one or more embodiments will be discussed. As shown in FIG. 5, system 500 may include a wireless device 100 having a programmable engine 114 to perform calibration and/or test algorithms as discussed with respect to FIG. 1 through FIG. 4, above. In one or more embodiments of system 500, a test database 510 may be deployed at the manufacturer of radio device 100. In order to enhance the diagnostic data obtained by the manufacturer, secure on-chip trusted radio diagnostics may be performed in-the-field by programmable engine 114 and securely transmitted back to the manufacturer. Such an arrangement may allow the manufacturer to collect a relatively large amount of valuable statistical data on the functioning of its chips in the field and/or data on how and why a chip may fail in the field. The collection diagnostic information may include data on which circuits and/or sub-circuits may be having problems and what the cause of the problems in order to implement adjustments, recalibrations, or retuning of radio device 100 and/or to make future designs more robust. These on-chip diagnostics may be performed either at the original equipment manufacturer (OEM), or in the field. The collection of the diagnostic data may be performed in such a way such that the manufacturer may trust the resulting information and further trust that the collected information is not exposed or otherwise available to unauthorized parties.

In one or more embodiments of system 500, programmable engine 114 may be configured to operate as an on-chip diagnostic engine, or a "checker", which is programmable by firmware 516 to run a series of diagnostic tests on the analog and radio-frequency (RF) components of radio device 100, and do so in a trusted manner that is not able to be tampered with by unauthorized parties. In some embodiments, system 500 may implement a secure, encrypted and/or authenticated method to download the firmware 516 to programmable engine 114 for the desired tests, either wired or wirelessly, from a centralized database 510 located at the manufacturer to wireless device 100. In further embodiments, system 500 may implement a secure, encrypted, and/or authenticated method to upload the test results back to the test database 510 located at the manufacturer, while reducing the ability of the data from being tampered with or intercepted by unauthorized parties.

As shown in FIG. 5, the firmware 516 to be executed by programmable engine 114 may be transmitted from a database 510 or other device such as a server or the like from the manufacturer via a secure download 512. Such a secure download 512 may involve encryption of the diagnostic test commands and firmware 516 downloaded to programmable engine 114. Upon receiving firmware 516, programmable engine 114 may decrypt and/or authenticate the secure download 512, and further may perform the requested diagnostics including signal processing on loopback signals from the analog front end 116 of radio device 100 and/or any other circuits, sub-circuits, or devices of radio device 100 as desired, in order to execute the requested on-chip tests on radio device 100, for example checking front end gain, the transmit output power, and so on. In some embodiments, a signature may be utilized for authentication, for example to ensure that the firmware 516 really is from the manufacturer or standard body, and/or further to ensure that the generated test report 518 really comes from device 100. As a result of the diagnostics, a test report 518 may be generated and transmitted back to the test database 510 of the manufacturer via a secure upload 520 which may involve encryption and authentication of the test report 518 by programmable engine 114 and subsequent decryption and authenticity verification of the test report 518 by the manufacturer. In some embodiments, the secure download 512 of firmware 516 is performed by the original equipment manufacturer (OEM), that is the manufacturer of the device or system in which radio device 100 may be deployed, either at the OEM or in which the download from the manufacturer is an intermediary between the manufacturer and radio device 100. Alternatively the manufacturer may securely download the firmware 516 directly to the radio device 100 in the field, for example via an internet connection, in which case the OEM may be bypassed and not directly involved in system 500. In yet another embodiment, test database 510 may be deployed at and by OEM, either on its own behalf or as an agent of the manufacturer of radio device. However, these are merely example arrangements and rearrangements of system 500, and the scope of the claimed subject matter is not limited in this respect. In other embodiments, programmable engine 114 may be configured to perform certification diagnostics and tests in order to confirm compliance with standards or regulatory requirements as shown in and described with respect to FIG. 6, below.

Figure 6:
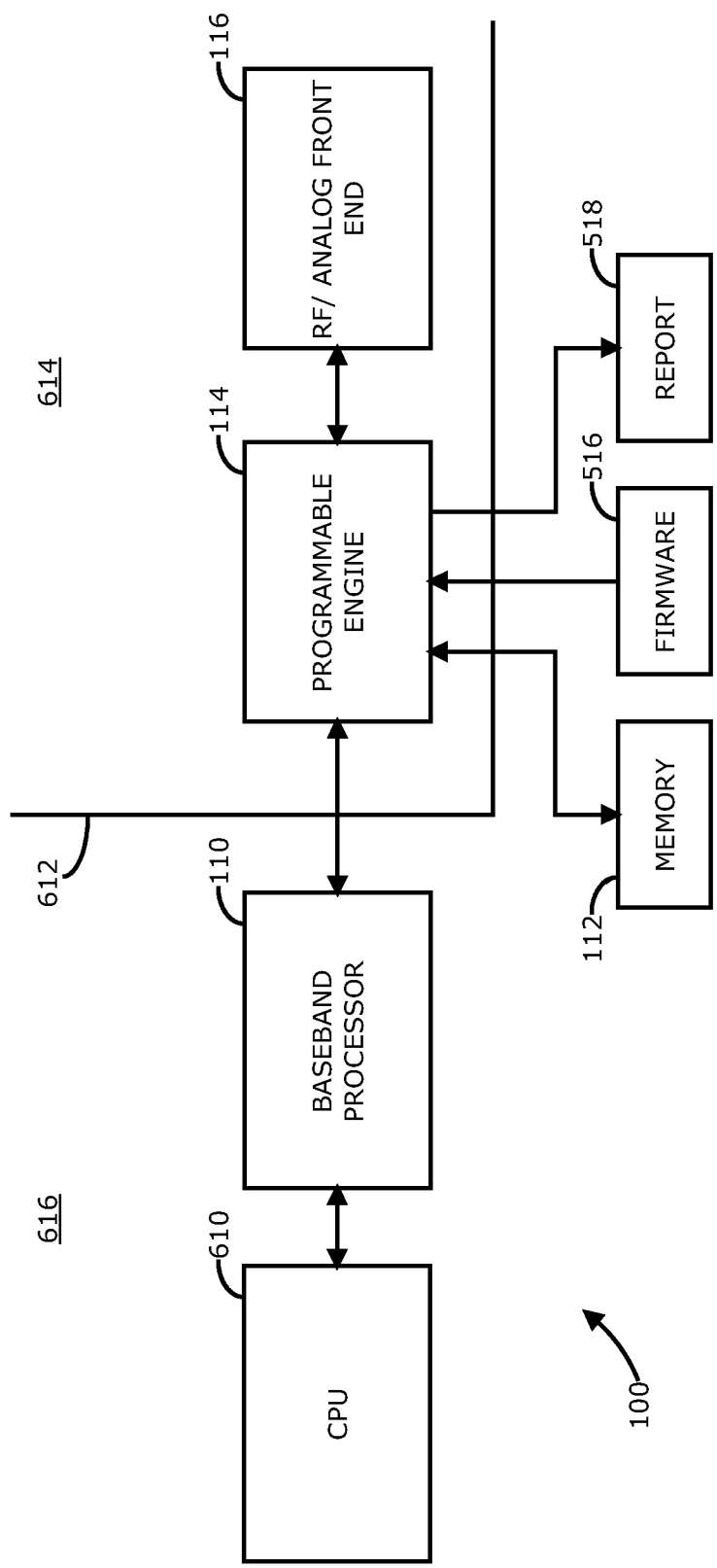
FIG. 6 is a block diagram of an on-chip tester capable of providing a trusted diagnostic report and certificate in accordance with one or more embodiments.

Referring now to FIG. 6, a block diagram of an on-chip tester capable of providing a trusted diagnostic report and certificate in accordance with one or more embodiments will be discussed. As shown in FIG. 6, radio device 100 may be configured to perform on-chip conformance testing to replace sampled external certification. In such an arrangement, programmable engine 114 is configured to operate as a secure on-chip conformance checker and certificate generator. The checker may be present on every radio die wherein programmable engine 114 is programmed to check the RF/analog front end 116 after radio device 100 has been deployed into a final product, system, or platform, to perform the certification requirements for relevant certification or standards bodies. By performing such certification diagnostics directly on radio device 100, the long certification may be reduced or otherwise avoided. Additionally, having a checker to perform certification directly on the radio device 100 allows for certification of all or nearly all radio devices 100 rather than only performing certification on merely a few samples of given design of radio device 100. The output of on-chip certification process for every radio device 100 will be certificates listing all the test results for the different certification bodies for which tests were performed. If the diagnostics confirm that radio device 100 is compliant to the tested regulations, radio device 100 will allow its own operation. Otherwise, radio device 100 will not allow itself to operate and an appropriate message may be indicated. Furthermore, during operation of radio device 100 programmable engine 114 may periodically check the analog front end 116 to determine whether any violation of the certifications occur due to component drift or failure, and so on. Note that since programmable engine 114 is disposed directly on radio device 100, programmable engine 114 is capable of checking the performance of radio device 100 when deployed in the final platform, board, system, or end device and not just the performance of radio device 100 in isolation.

In one or more embodiments, programmable engine 114 as the test hardware itself may be certified beforehand by the appropriate certification body in order to allow the trust of test results provided by programmable engine 114. This certification may be done before tape-out of radio device 100. After certification of programmable engine 114, the tester design may not be altered anymore unless recertification is performed. However, since programmable engine 114 is a (variation insensitive) digital circuit, which in its turn checks the sensitive analog front end 116, it is no problem if such other parts of the radio device 114 are changed over time.

As shown in FIG. 6, programmable engine 114, memory 112, and report 518 are part of certification operation. Line 612 separates the "trusted region" 614 from the "untrusted region" 616 wherein devices in untrusted region 616 may be altered or redesigned without requiring recertification and which may include the central processing unit (CPU) 610 or the like of the system or platform in which radio device 100 is deployed. Furthermore, untrusted region 616 may be considered as a region having circuits, blocks or other devices that were not tested and which may possibly may be altered, reconfigured, or otherwise accessed by third parties who may be known or unknown. However, such alteration, reconfiguration, and/or access to trusted region 614 by third parties is prevented or otherwise not able to occur. Secure data is located in trusted region 614 wherein no unsecure data should cross line 612. Communication between trusted region 614 and untrusted region 616 may occur via security procedures as shown in and described with respect to FIG. 5, above, for example using encryption, decryption and authentication, in order to generate a trusted report 518 by programmable engine 114.

In one or more embodiments, programmable engine 114 takes its instructions from memory 112 disposed on-chip on radio device 100. The tests are hence programmed in firmware 516 and may be provided and/or certified by manufacturer of radio device 100 and/or the individual certification bodies where certification is involved. This firmware 516 may be loaded externally and may be encrypted and authenticated so that no unauthorized parties can read or tamper with the firmware 516. Having the diagnostics and certification tests programmed in firmware 516 allows manufacturer and/or the certification body to update the firmware 516 over time. Since the manufacturer or the certification bodies own the code, they certify the firmware 516 themselves and can therefore trust the firmware 516 if loaded on the programmable engine in a secure and uncorrupted manner. In some embodiments, firmware 516 and/or test results may be stored in memory 212 disposed in programmable engine 114 as shown in FIG. 2, or alternatively, for example if larger chunks of code and/or test data need to be retained and stored, programmable device 114 may offload the code and/or test data to memory 112 or to a memory located external to radio device 100 in a secure manner to be later retrieved. In such an arrangement, off-loaded data may be encrypted and authenticated so that programmable engine 114 may ensure no one has altered or read the code or data between the time it was written and later read back. However, during testing no unsecure data crosses line 612. After all tests are done, programmable engine 114 writes out a diagnosis report 518 which may include a certification certificate. The report 518 or certificate is authenticated to come from programmable engine 114 and the particular piece of firmware 516 loaded onto programmable device 114, and encrypted so that only the authorized parties are able read and access report 518 or the certificate.

In the embodiments shown herein, programmable engine 114 is shown and described with respect to performing diagnostics and/or certification tests on an analog front end 116 of a radio device 100. However, it should be known that programmable device 114 may be deployed generally for any portion of a system-on-a-chip (SoC) or the like, for analog circuits and systems and/or digital circuits and systems, and the scope of the claimed subject matter is not limited in this respect.

Figure 7:
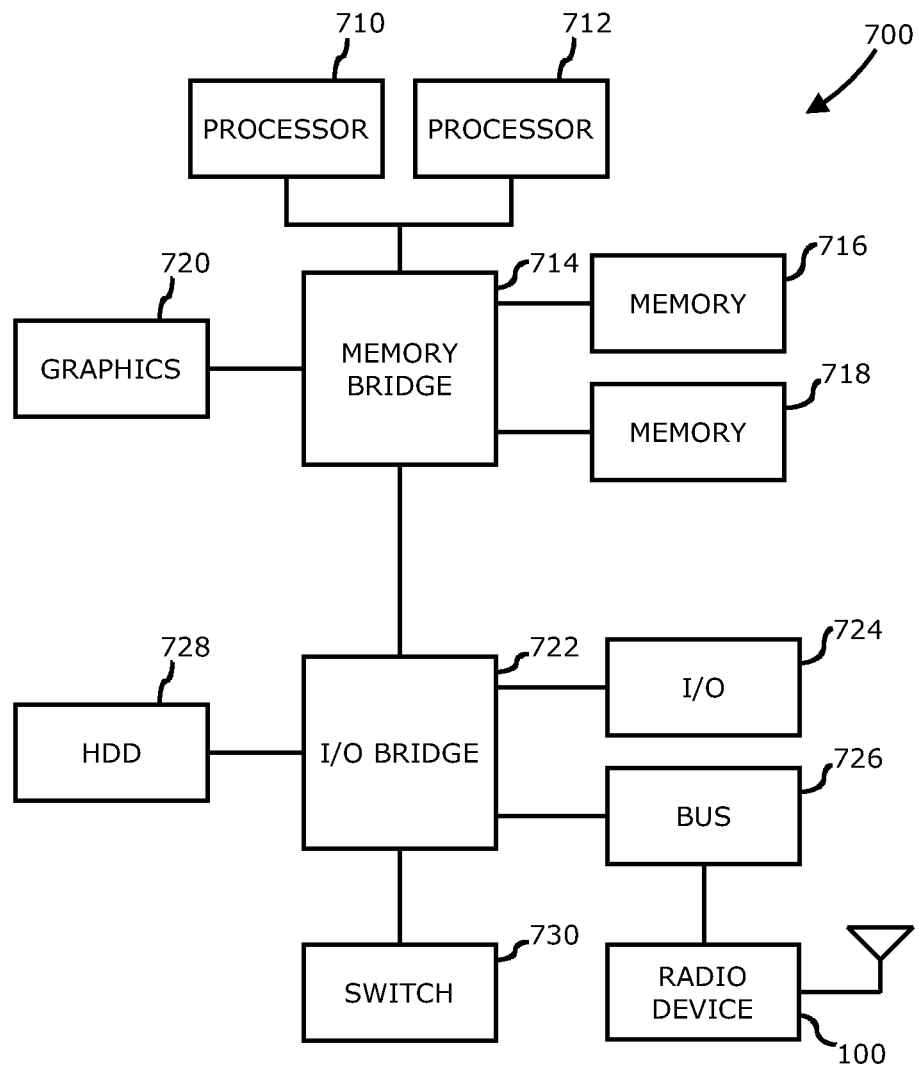
FIG. 7 is a block diagram of an information handling system with a radio device having a programmable engine having a reconfigurable data path in accordance with one or more embodiments.

Referring now to FIG. 7, a block diagram of an information handling system with a radio device having a programmable engine having a reconfigurable data path in accordance with one or more embodiments will be discussed. Information handling system 700 of FIG. 7 may tangibly embody a platform on which radio device 100 of FIG. 1 is deployed. Although information handling system 700 represents one example of several types of computing platforms, information handling system 700 may include more or fewer elements and/or different arrangements of elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example volatile type memory and/or non-volatile type memory. Memory bridge 714 may couple to a graphics system 720 to drive a display device (not shown) coupled to information handling system 700.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial ATA type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. As shown in FIG. 7, information handling system 700 may include radio device 100 of FIG. 1 and further as shown in described herein with respect to other figures.

Although the claimed subject matter has been described with a certain degree of particularity, it should be recognized that elements thereof may be altered by persons skilled in the art without departing from the spirit and/or scope of claimed subject matter. It is believed that the subject matter pertaining to a programmable engine having a reconfigurable accelerator data path for radio devices and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
    an analog front end comprising a radio to transmit or receive radio-frequency signals, or combinations thereof; and
    a programmable engine coupled to the analog front end, wherein the programmable engine is configured to perform one or more tests on the analog front end;

wherein the programmable engine includes a reconfigurable data path reconfigurable by the programmable engine to perform one or more tests on the analog front end, and a post processing module, the post processing module including one or more reconfigurable accelerator blocks to perform processing routines for the one or more tests, and a reconfigurable interconnect to connect or sequence the one or more accelerator blocks according to the test to be performed by the programmable engine.

2. The apparatus as claimed in claim 1, wherein the programmable engine comprises a controller core and a memory coupled to the controller core to configure hardware of the programmable engine for one or more tests to be performed on the analog front end.

3. The apparatus as claimed in claim 1, wherein the programmable engine comprises a stimuli generation module to generate test stimuli for the one or more tests performed on the analog front end.

4. The apparatus as claimed in claim 3, wherein the stimuli generation module is programmable to generate different kinds of waveforms including noise, orthogonal frequency-division multiplexing (OFDM) signals, sine waves, or combinations thereof.

5. The apparatus as claimed in claim 1, wherein the programmable engine comprises a post processing module, wherein the post processing module is reconfigurable to process the one or more tests based at least in part on a response from the analog front end to the one or more tests.

6. The apparatus as claimed in claim 1, wherein one or more of the reconfigurable accelerator blocks are optimized for kernels of calibration procedures or test procedures, or combinations thereof.

7. The apparatus as claimed in claim 1, wherein the programmable engine comprises a post processing module, the post processing module including a field-programmable gate array to be configure one or more of the tests to be performed by the programmable engine.

8. A system, comprising:
a processor and a memory coupled to the processor; and
a radio device coupled to the processor to transmit data stored in the memory and to store data received by the radio device in the memory, wherein the radio device comprises:
an analog front end comprising a radio to transmit or receive radio-frequency signals, or combinations thereof; and
a programmable engine coupled to the analog front end, wherein the programmable engine is configured to perform one or more tests on the analog front end;
wherein the programmable engine includes a reconfigurable data path reconfigurable by the programmable engine to perform one or more tests on the analog front end, and a post processing module, the post processing module including one or more reconfigurable accelerator blocks to perform processing routines for the one or more tests, and a reconfigurable interconnect to connect or sequence the one or more accelerator blocks according to the test to be performed by the programmable engine.

9. The system as claimed in claim 8, wherein the programmable engine comprises a controller core and a controller memory coupled to the controller core to configure hardware of the programmable engine for one or more tests to be performed on the analog front end.

10. The system as claimed in claim 8, wherein one or more of the reconfigurable accelerator blocks are optimized for kernels of calibration procedures or test procedures, or combinations thereof.

* * * * *